(12) United States Patent (10) Patent No.: US 12,300,405 B2
Someya et al. (45) Date of Patent: May 13, 2025

(54) ELECTRONIC FUNCTIONAL MEMBER AND STRAIN SENSOR

(71) Applicant: The University of Tokyo, Tokyo (JP)

(72) Inventors: Takao Someya, Tokyo (JP); Akihito Miyamoto, Tokyo (JP); Yan Wang, Tokyo (JP); Yorishige Matsuba, Tokyo (JP); Ikue Kawashima, Tokyo (JP)

(73) Assignee: The University of Tokyo, Tokyo (JP)

( * ) Notice: Subject to any disclaimer, the term of this patent is extended or adjusted under 35 U.S.C. 154(b) by 533 days.

(21) Appl. No.: 17/442,787

(22) PCT Filed: Apr. 3, 2020

(86) PCT No.: PCT/JP2020/015353
§ 371 (c)(1),
(2) Date: Sep. 24, 2021

(87) PCT Pub. No.: WO2020/204171
PCT Pub. Date: Oct. 8, 2020

(65) Prior Publication Data
US 2022/0199286 A1 Jun. 23, 2022

Related U.S. Application Data

(60) Provisional application No. 62/828,555, filed on Apr. 3, 2019.

(51) Int. Cl.
*H01B 7/06* (2006.01)
*G01L 1/22* (2006.01)
*H01B 13/00* (2006.01)

(52) U.S. Cl.
CPC .............. *H01B 7/06* (2013.01); *G01L 1/2287* (2013.01); *H01B 13/0036* (2013.01)

(58) Field of Classification Search
CPC ...... H01B 7/06; H01B 13/0036; G01L 1/2287
See application file for complete search history.

(56) References Cited

U.S. PATENT DOCUMENTS

2020/0072596 A1* 3/2020 Pang ..................... G01L 1/2287

FOREIGN PATENT DOCUMENTS

| CN | 105527014 A | 4/2016 | |
| CN | 107447539 A | 12/2017 | |
| CN | 108074660 A * | 5/2018 | ............ B82Y 30/00 |
| CN | 108303145 A | 7/2018 | |
| JP | 2016112246 A | 6/2016 | |
| WO | 2009102077 A1 | 8/2009 | |

(Continued)

OTHER PUBLICATIONS

English Machine Translation of CN 108074660 A, May 25, 2018, translated online Aug. 2024 (Year: 2018).*

(Continued)

*Primary Examiner* — David Z Huang
(74) *Attorney, Agent, or Firm* — Dorsey & Whitney LLP

(57) ABSTRACT

[Problem] To provide an electronic functional member having high stretch-resistance. [Solution] An electronic functional member provided with: fibers formed in web-like shape and configuring a fiber web; a coating film coating the fibers and having a Young's modulus smaller than that of the fibers; and an electrically conductive film formed on the surface of the coating film.

7 Claims, 7 Drawing Sheets

(56) References Cited

FOREIGN PATENT DOCUMENTS

| WO | 2017182929 | A2 | 10/2017 |
| WO | 2018095431 | A1 | 5/2018 |

OTHER PUBLICATIONS

International Search Report and Written Opinion for International Patent Application No. PCT/JP2020/015353 dated Jun. 16, 2020, 11 pages.

* cited by examiner (A)

(B)

(A)

(B)

(C)

(A)

(B)

ly for understanding the invention.

ELECTRONIC FUNCTIONAL MEMBER AND STRAIN SENSOR

CROSS-REFERENCE TO RELATED APPLICATIONS

This application is the national stage application of International Patent Application No. PCT/JP2020/015353 filed on Apr. 3, 2020 and entitled "Electronic Functional Member and Strain Sensor", which claims priority to U.S. Patent Application No. 62/828,555 filed on Apr. 3, 2019 and entitled "Electronic Functional Member and Strain Sensor" the entire contents of which are hereby incorporated by reference herein in their entireties.

TECHNICAL FIELD

This invention relates to an electronic functional member, and a strain sensor configured using the electronic functional member.

BACKGROUND ART

Recently, flexible electronics has attracted a lot of attention because softness of the materials provides various applications. Particularly, in accordance with the worldwide aging of the society, the health care field has been drawing increasing attention. For example, the flexible electronics has been attracting attention as means for directly obtaining biological information from cells and tissues by attaching to the surface of the human body and inside the body.

Generally, while the flexible electronics is manufactured by forming an electronics device on a flexible substrate, its flexibility cannot be said to be sufficient. Therefore, the surface followability cannot be said to be sufficient, and thus it is impossible to obtain information with high accuracy and to sufficiently reduce the uncomfortable feeling and the like during the attachment.

To solve such a problem, there has been proposed an electronic functional member in which a fiber network of a nanofiber made of water-soluble polyvinyl alcohol (PVA) is formed by an electrospinning method, and gold is vapor-deposited thereon to form an electrode layer, thereby providing sufficiently high surface followability, stretchability in a lateral direction, permeabilities of gas and water, and transparency (for example, Non-patent Document 1).

Non-Patent Document 1: Akihito Miyamoto et. al., Nature Nanotechnology 12,907(2017)

SUMMARY OF THE INVENTION

Problems to be Solved by the Invention

However, when the electronic functional member of the above-described prior art is directly adhered to the skin to be used, there is room for improving the stretch resistance.

Therefore, the inventors involved in this application have been dedicated to the examination and found that, by forming a fiber network composed of 1 kinds of resins into a configuration in which the fiber network is coated with another resin, stretch resistance is improved.

The present invention is made in consideration of the above-mentioned points, and an object of this invention is to provide an electronic functional member having improved stretch resistance, and a strain sensor.

Solutions to the Problems

To achieve the above object, the electronic functional member of the present invention is constituted by including a fiber formed in a network shape constituting a fiber network, a coating layer having a Young's modulus lower than that of the fiber covering the fiber, and a conductive layer formed on the surface of the coating layer.

Further, the strain sensor of the present invention includes a detection section, a measuring section, and an output section, the detection section is attached to the measurement object, a portion where the electrical resistance value changes in response to the shape or change of the measurement object, the measuring section measures the electrical resistance value of the detection section, sends the electrical resistance value to the output section, the output section, based on the electrical resistance value received from the measuring section, and outputs a predetermined signal.

Effects of the Invention

According to the electronic functional member and the strain sensor of this invention, the stretch resistance is improved by coating a fiber network composed of one type of resin with another resin.

DESCRIPTION OF PREFERRED EMBODIMENTS

While the following describes embodiments of the invention with reference to the drawings, shapes, sizes, and positional relationships of respective components are only schematically illustrated for understanding the invention. While the following describes preferred exemplary configurations of the invention, materials, numerical conditions, and the like of respective components are merely preferable examples. Therefore, the invention is not limited to the following embodiments, and many changes or modifications that can achieve the effects of the invention can be made without departing from the scope of the configuration of the invention.

(Nanomesh Electrode)

Figure 1:
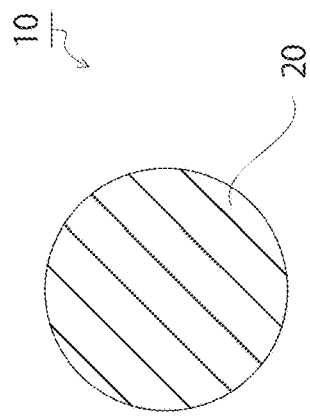
FIGS. 1(A)-(F) are schematic diagrams for explaining a nanomesh electrode.
Figure 1:
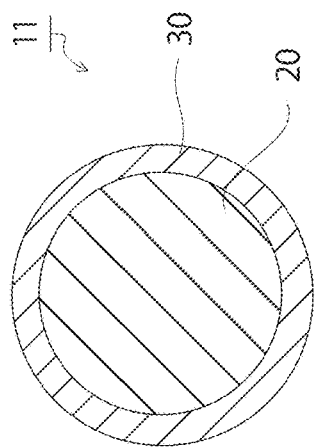
Figure 1:
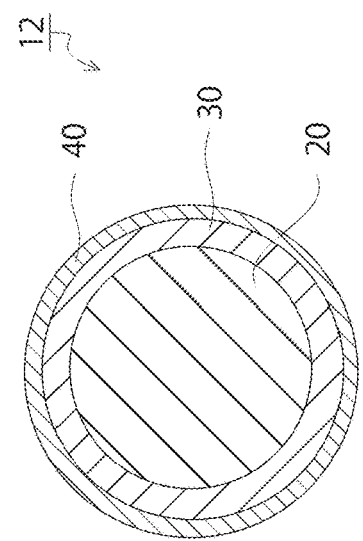
Figure 1:
Figure 1:
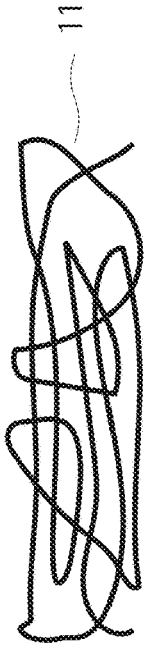
Figure 1:
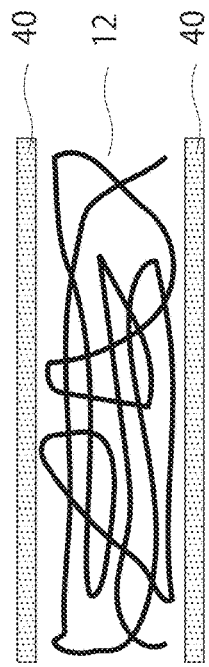

Referring to FIG. 1, a nanomesh electrode will be described as an e electronic functional member according to this invention. FIG. 1 is a schematic diagram for explaining a nanomesh electrode. FIGS. 1(A)-(C) are schematic configuration diagrams of nanomesh electrodes, and FIGS. 1(D)-(F) are schematic cross-sectional views of fibers of nanomesh electrodes.

The electronic functional member is provided in a network shape, and includes fibers 20 constituting the sheet-like fiber network 10, a coating layer 30 covering the fibers 20, and a conductive layer 40 formed on the surface of the coating layer 30.

As a core material constituting the fiber 20, polyurethane is used. In this case, the fiber network 10 is formed by an electrospinning method using a polyurethane solution of 13% by weight. As a solvent of this polyurethane solution, for example, a 7:3 mixed solution of N, N-dimethylformamide and methyl ethyl ketone is used. In forming the fiber network 10, the condition of the electrospinning method may be a spinning time of 30 minutes, an applied voltage of 25 kV, and a discharge rate of 1 ml/hour. After carrying out the electrospinning method, a 1 minute ultraviolet (UV) ozonation treatment is performed to obtain a fiber network 10 (see FIGS. 1 (A) and (D))

Note that the diameter of the fiber 20, in this example, the polyurethane fiber is preferably within a range of 100 nm to 1 μm, and more preferably within a range of 200 nm to 700 nm. In this case, the polyurethane fiber is so-called nanofiber. The Young's modulus of polyurethanes is 100 MPa~700 MPa, and the Young's modulus of polyurethanes is relatively high.

Here, an example in which a polyurethane is used as a core material has been described, but this invention is not limited thereto. The core material may be any material capable of forming a fiber network of nanofibers by an electrospinning method. This is because it is difficult to form a fiber network of nanofibers in a material having a very low Young's modulus. In addition to polyurethane, for example, a polyvinyl alcohol (PVA) derivative, a polyvinylidene fluoride (PVDF), or the like can be used as the core material.

As a coating material constituting the coating layer 30, a silicone resin, for example, polydimethylsiloxane (PDMS) is used. In this case, the coating layer 30 is formed by applying a dip coating using a PDMS solution to the fibers. This PDMS solution is obtained by dissolving a PDMS precursor with hexane (hexane). The weight-ratio of PDMS precursor to hexane is, for example, 1:100

The thickness of the coating layer 30 is preferably within a range of 30 nm to 300 nm, and more preferably within a range of 70 nm to 150 nm. Further, the Young's modulus of PDMS is generally 4 MPa~40 MPa, relatively low Young's modulus (see FIGS. 1 (B) and (E)).

Here, an example in which a PDMS is used as a coating material has been described, but the present invention is not limited thereto. As the coating material, a material having a low Young's modulus is preferred. In addition to PDMS, for example, ethylene vinyl acetate (EVA) resin or the like can be used as the coating material.

As a conductive member constituting the conductive layer 40, gold (Au) is used. In this case, the conductive layer 40 is formed by vacuum deposition of Au on the coated fiber network 11 which the coating layer 30 is formed on the fibers 20. Here, when the conductive layer 40 is formed from both sides of the sheet-like coated fiber network 11, the conductive layer 40 is formed on the entire surface of the fiber 20 coated with the coating layer 30. As a result, the nanomesh electrode 12 is obtained.

Here, in FIG. 1 (C), although the conductive layer 40 is provided on both surfaces of the nanomesh electrode 12, this is for convenience in order to show the surface on which the conductive layer 40 is formed. Also in other figures, in order to show the surface on which the conductive layer 40 is formed, it may be described for convenience. The conductive layer 40 may be formed only from one side of the sheet-like coated fiber network 11.

The thickness of the conductive layer 40 is preferably in the range of 30 nm to 300 nm, more preferably 70 nm to 150 nm.

Here, as the conductive member, an example of using Au has been described, but is not limited thereto. As the conductive member, silver (Ag), titanium (Ti), platinum (Pt), or the like can be used in addition to Au. The method of forming the conductive layer is not limited to vacuum evaporation. As a method for forming the conductive layer, a sputtering method, spin coating, slit coating, or screen printing using a dispersion liquid of the conductive member can be used.

(Evaluation of Stretch Resistance)

Figure 2:
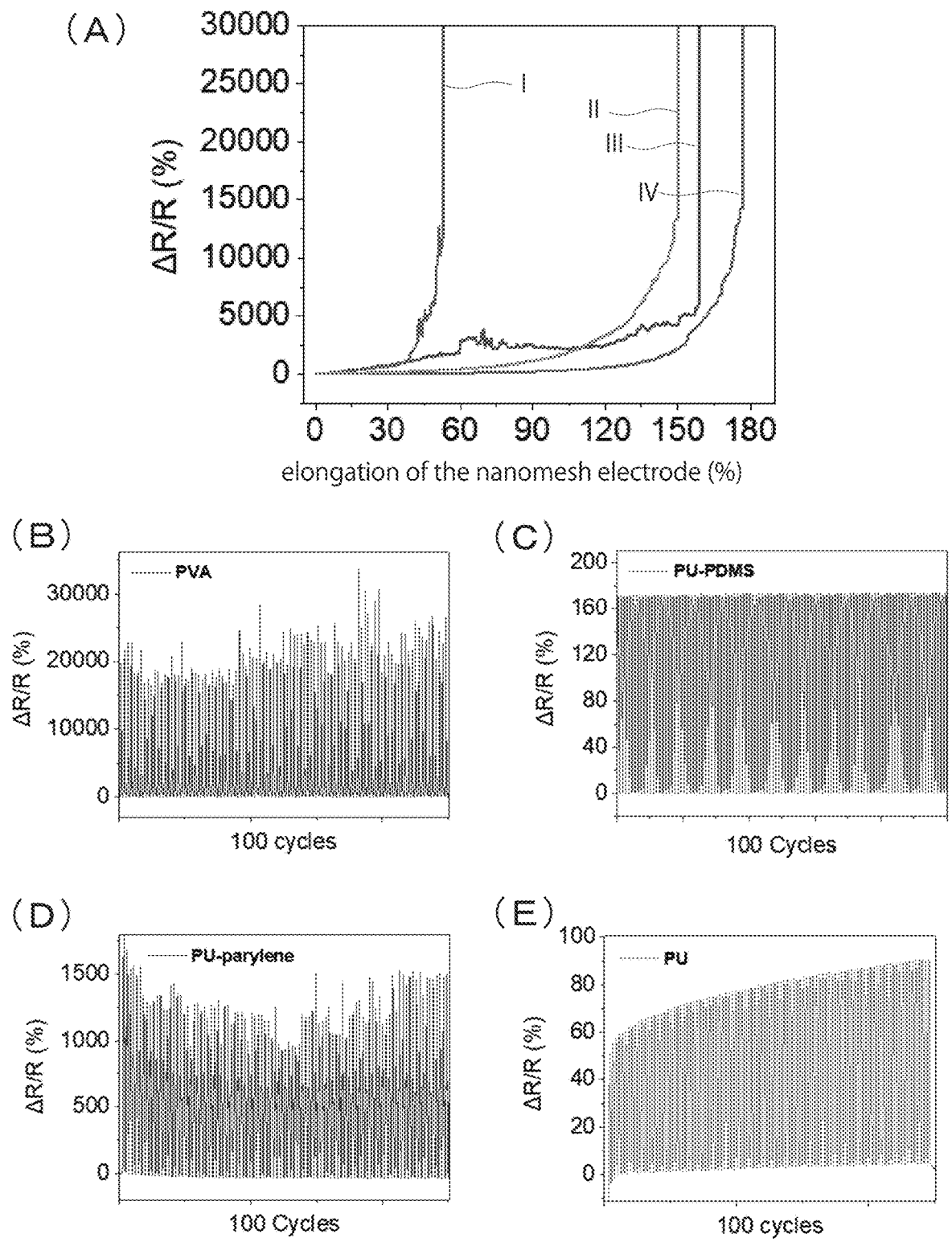
FIGS. 2(A)-(E) are diagrams illustrating the evaluation results of the stretching resistance (1).
Figure 3:
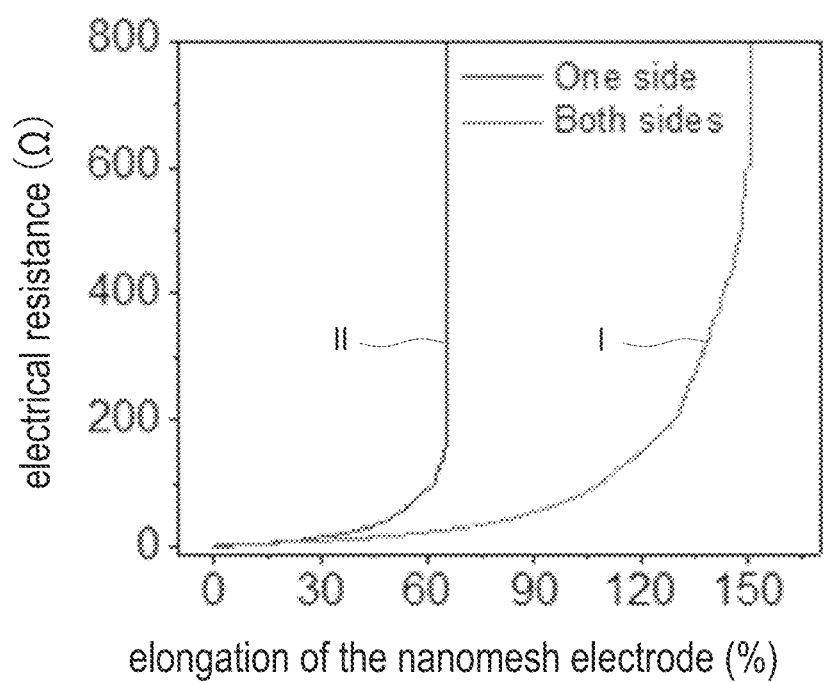
FIG. 3 is a diagram illustrating the evaluation results of the stretching resistance (2).

Referring to FIGS. 2 and 3, an evaluation of the stretch resistance of the nanomesh electrode will be described. FIGS. 2 and 3 are diagrams showing evaluation results of the stretch resistance.

The evaluation of the stretch resistance is performed as follows. First, a PDMS layer is formed on a glass substrate with a thickness of 200 μm. Next, an adhesive layer is formed on PDMS layer. The adhesive layer is formed by subjecting a liquid-like PDMS to a spin-coating method at a thickness of 100 nm. Next, a nanomesh electrode to be evaluated is attached on the adhesive layer. After the liquid-like PDMS has dried, the glass-substrate is peeled off. The stretch resistance of the thus obtained nanomesh electrodes attached to the 200-μm-thick PDMS layers was evaluated.

In FIG. 2 (A), the horizontal axis, shown by taking the elongation of the nanomesh electrode (%), the vertical axis, shows the rate of change of electrical resistance ΔR/R (%). Here, an elongation of 60% means that the elongational length of the nanomesh electrode in the initial state before elongation is increased by 60%, i.e., 1.6 times.

FIG. 2A shows the difference in the configuration of the fiber network. In FIG. 2(A), curve I shows the case where the fiber is composed of the PVA derivative and the coating layer is not provided, curve II shows the case where the core material is polyurethane (PU) and the coating material is PDMS, curve III shows the case where the core material is polyurethane and the coating material is polyparaxylene (parylene), and curve IV shows the case where the fiber is composed of polyurethane and the coating layer is not provided.

Here, the Young's modulus of the polyparaxylene is 2 GPa~3 GPa and is higher in Young's modulus than that of the polyurethane.

In both the cases of curves I to IV, the resistance value increases little by little as the elongation increases. When the fiber is composed of a PVA derivative (curve I), the resistance value increases rapidly at an elongation of about 50%, that is, the fiber breaks. On the other hand, when the fiber is composed of polyurethane (curves II to IV), when the elongation is around or above 150%, the resistance value increases rapidly. As described above, when the fiber is composed of polyurethane, the stretch resistance is improved as compared with a case where the fiber is composed of a PVA derivative.

FIGS. 2 (B)-(E) show the results of stretching cycle tests on the nanomesh electrodes corresponding to curves I-IV in FIG. 2 (A), respectively. In FIG. 2 (B)-(E), shows the repetition period on the horizontal axis taken in units of 100 cycles, the vertical axis, shows the rate of change of the electric resistance ΔR/R (%). Here, extension (30%) and release (0%) are repeated.

When the fiber is composed of the PVA derivative shown in FIG. 2B, and when the core material shown in FIG. 2D is polyurethane and the coating material is polyparaxylene (parylene), the rate of change ΔR/R (%) of the electric resistivity fluctuates with each repetition period. When the fiber is made of the polyurethane shown in FIG. 2E and the coating layer is not provided, the variation of the rate of change ΔR/R (%) of the electric resistance for each repetition period is small, but the value of the rate of change ΔR/R (%) of the electric resistance increases as the number of times increases.

On the other hand, when the core material of FIG. 2C is polyurethane (PU) and the coating material is PDMS, the variation of the rate of change ΔR/R (%) of the electric resistance for each repetition period is small, and the rate of change ΔR/R (%) of the electric resistance is substantially constant even if the number of times increases.

Thus, by using a core material as a polyurethane (PU) and a coating material as a PDMS, excellent stretch resistance is exhibited.

FIG. 3 shows the case (I) where the conductive layer is provided on both sides of the sheet-like coated fiber network and the case (II) where the conductive layer is provided on only one side of the sheet-like coated fiber network in the nanomesh electrodes in which the core material is polyurethane (PU) and the coating material is PDMS.

When a conductive layer is provided on both sides (I) and when a conductive layer is provided only on one side (II), the resistance value when the elongation increases is increased little by little. When a conductive layer is provided only on one side (II), the elongation is around 60%, the resistance value increases rapidly, i.e., disconnection. On the other hand, when the conductive layer is provided on both sides (II), the elongation is up to around 150%, the resistance value is increased little by little, per elongation exceeds 150%, the resistance value is rapidly increased. Thus, when providing a conductive layer on both sides, than when providing a conductive layer only on one side, excellent stretching resistance can be obtained.

(Method of Attaching the Nanomesh Electrode)

The nanomesh electrode, which is the electronic functional member according to the present invention, is not made of a water-soluble material. For this reason, it is not possible to attach the nanomesh electrode simply by placing it on the surface of the object to be measured, such as the skin, and then exposing it to water vapor.

As an example of the method of attaching the nanomesh electrode to the skin, 3 methods will be described.

In the first method, a 10 wt % aqueous PVA solution is applied to the skin and a nanomesh electrode is applied on the PVA before the PVA dries. In the second method, a fiber network using PVA as a resin material is formed by electrospinning, and then a nanomesh electrode is laminated. Thereafter, a fiber network of PVA is installed so as to be in contact with the skin, and water vapor exposure is performed. In this method, a part or all of a fiber network containing PVA as a resin material is applied to the skin by utilizing water dissolution. In the third method, a PVA film is made by a spin coating method of 500 rpm using 10 wt % PVA aqueous solution, and this PVA film is applied to the skin. A nanomesh electrode is placed on the PVA film and steam exposure is performed as in the second method. By this first to third method, a nanomesh electrode can be affixed to the skin.

(Strain Sensor)

Figure 4:
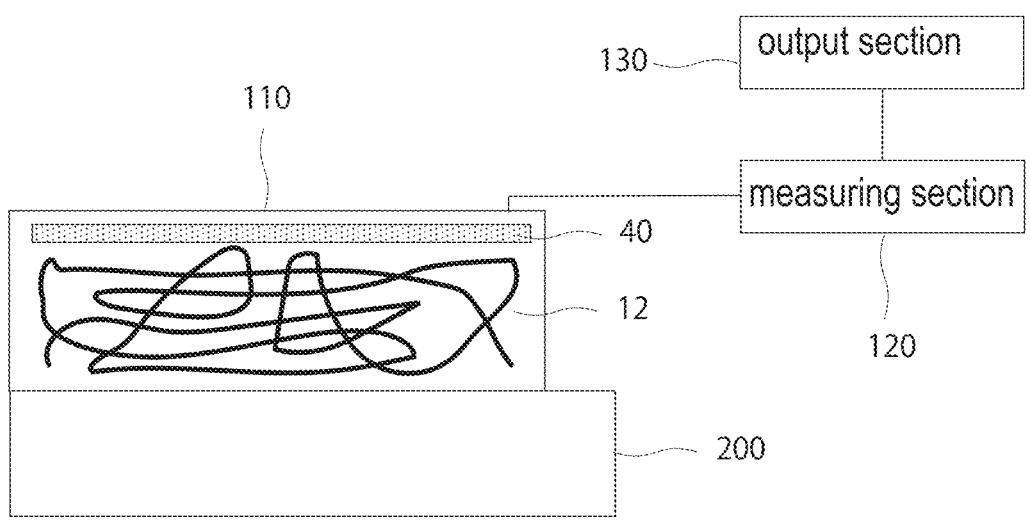
FIG. 4 is a schematic configuration of a strain sensor.

Referring to FIG. 4, a strain sensor using the nanomesh electrode will be described. FIG. 4 is a schematic configuration diagram of a strain sensor.

Strain sensor, for example, the detection section 110, the measuring section 120, and is configured to include an output section 130. Detection section 110 is attached to the measurement object 200, a portion where the electrical resistance value changes according to the shape or change thereof of the measurement object 200. Measuring section 120 measures the electrical resistance value of the detection section 110, and sends the electrical resistance value to the output section 130. The output section 130, based on the electrical resistance value received from the measuring section 120, and outputs a predetermined signal. Since a person skilled in the art can arbitrarily and suitably configure the measuring section 120 and the output section 130, detailed description thereof is omitted here.

Detection section 110 is constituted by a nanomesh electrode. In the following description, the detection section and the nanomesh electrode may be denoted by the same reference numeral 110.

In the nanomesh electrode 110, the conductive layer 40 is formed on the surface of the non-conductive fiber. In addition, fibers constitute a network of fibers. In this case, when the nanomesh electrode 110 is stretched, the area occupied by the fibers per unit area (hereinafter, referred to as fiber density) decreases, so that the number of contact points of the conductive layer decreases. The electrical resistance increases as the number of contact points of the conductive layer decreases. On the other hand, when the nanomesh electrode 110 is compressed, the number of contact points of the conductive layer increases because the fiber density increases. The electrical resistance decreases as the number of contact points of the conductive layer increases.

Thus, the expansion and contraction of the nanomesh electrode 110 changes the electrical resistance. Therefore, by attaching the nanomesh electrode 110 to the measurement object 200, by measuring the electrical resistance, it is possible to measure the shape and its change of the object.

Conventional strain sensors cannot measure the shape of a nonplanar surface, such as a soft or curved surface, or its change. For this reason, it is difficult to follow the movement of a living body such as a muscle, and it is difficult to measure the movement.

On the other hand, according to the strain sensor of this embodiment, since the detection section 110 attached to the measurement object 200 is formed of a fiber network, the shape and change of the soft and non-planar measurement object such as the surface of the living body can be measured.

The nanomesh electrode used as the detection section 110 of the strain sensor, the thickness dependence will be described. Here, in order to evaluate the thickness dependence, a nanomesh electrode using a PVA derivative as a material is used.

Two types of nanomesh electrodes with a thickness of 7 μm and nano-mesh electrodes with a thickness of 10 μm were fabricated. Since the diameter of the fibers (nanofibers) constituting the nanomesh electrode is about 500 nm, the nanomesh electrode having a thickness of 7 μm has a layer structure of about 14 layers, and the nanomesh electrode having a thickness of 10 μm has a layer structure of about 20 layers.

Also, for each of the nanomesh electrodes having a thickness of 7 μm and a thickness of 10 μm, two types of conductive layer having a thickness of 50 nm and a thickness of 75 nm were prepared.

A scanning probe microscope (SPM: Scanning Probe Microscope) was used to observe microscopic conduction conditions for the fabricated nanomesh electrodes.

Figure 5:
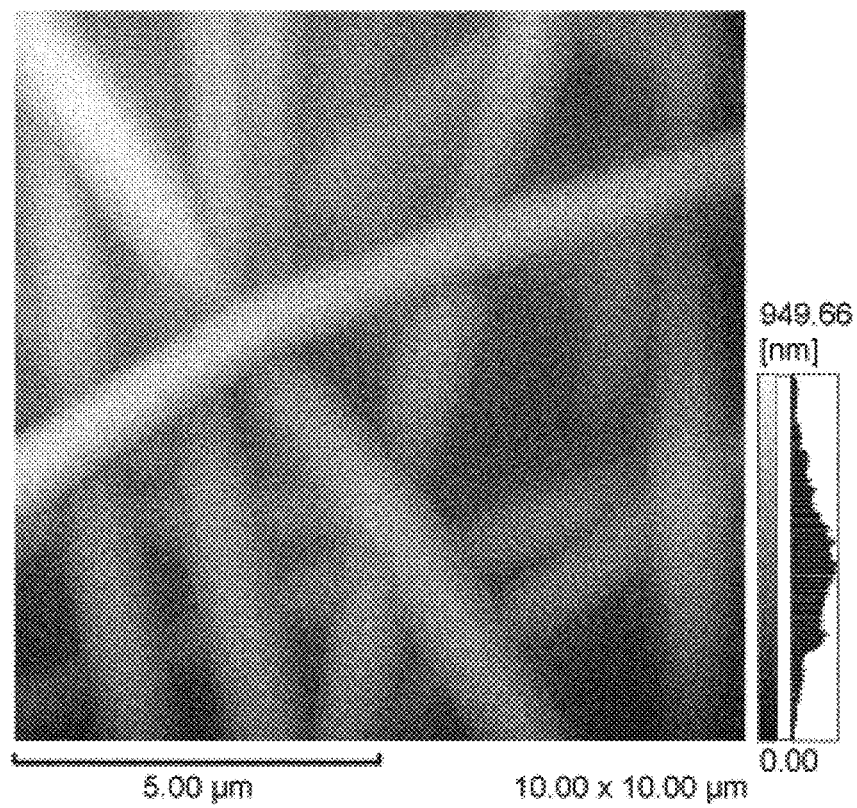
FIGS. 5(A)-(B) are images of the nanomesh electrode obtained by SPM.
Figure 5:
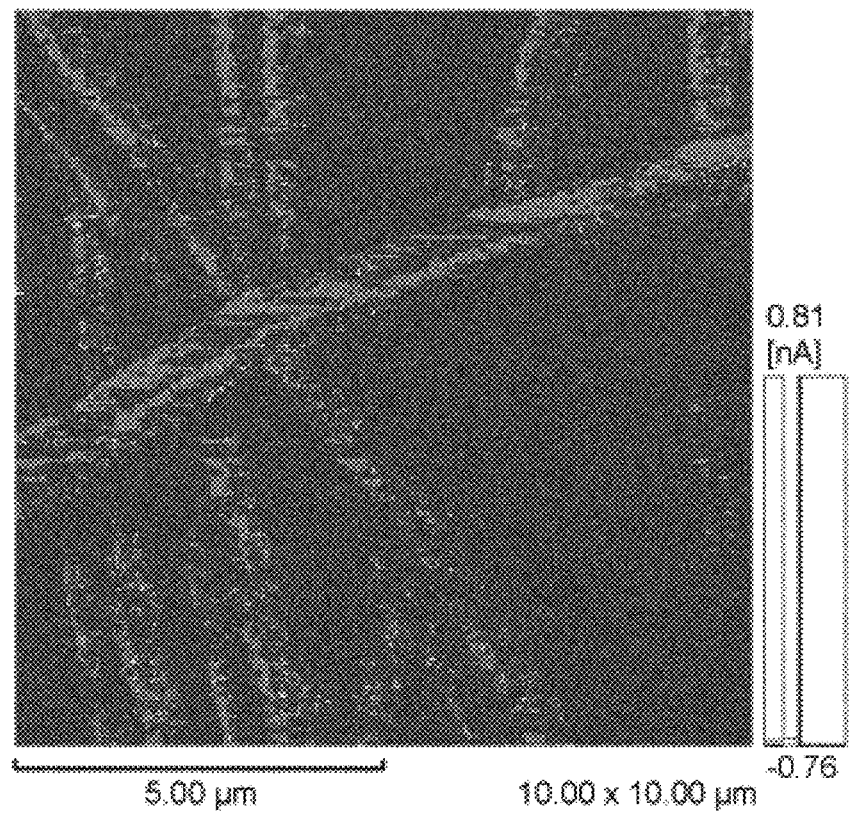

FIG. 5 is an image of a nanomesh electrode obtained with SPM. FIG. 5 (A) is an image of a normal measurement mode, FIG. 5 (B) is an image showing a conductive layer of the reference region as a reference for measurement of electrical resistance, and a conductive layer of the nanomesh electrode to be measured is conductive region.

Comparing FIGS. 5 (A) and 5 (B), it can be seen that there is a conductive layer that conducts with the reference region and a conductive layer that is not conductive with the reference region. It is considered that the conductive layer which is not conducting is a shade of other fibers in which certain fibers are present on the surface side, the conductive layer is not deposited, and the conductive layer of the upper limit fibers is not conducting.

Figure 6:
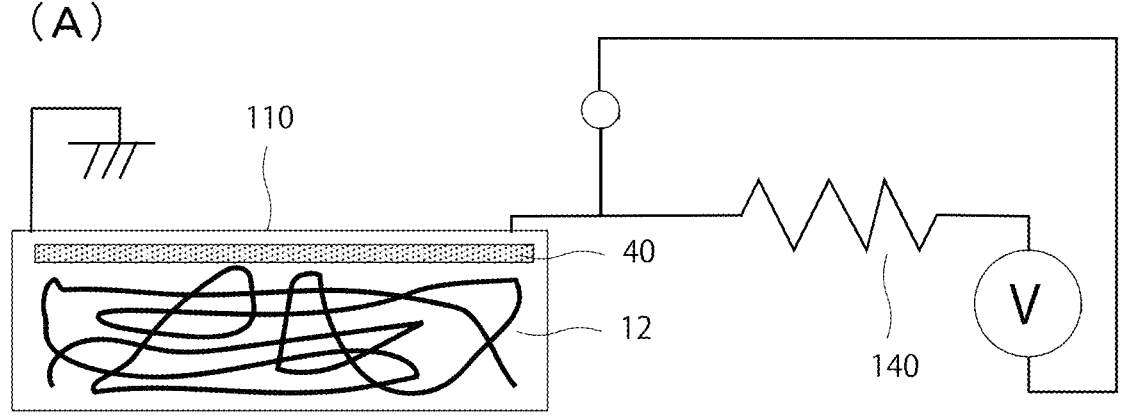
FIGS. 6(A)-(C) are diagrams for explaining the measurement of the change in the electrical resistance value of the nanomesh electrode.
Figure 6:
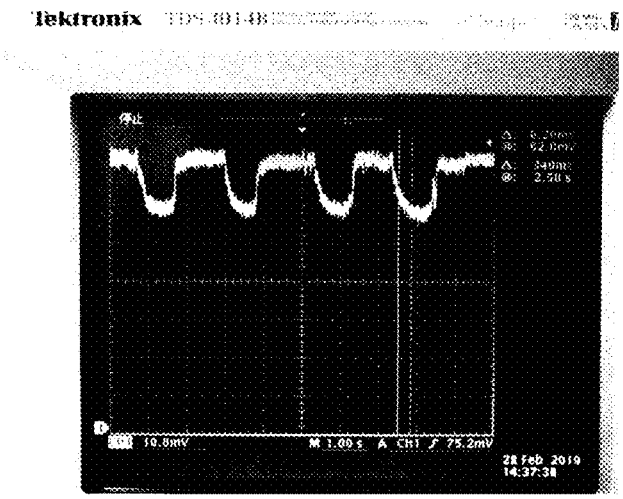
Figure 6:
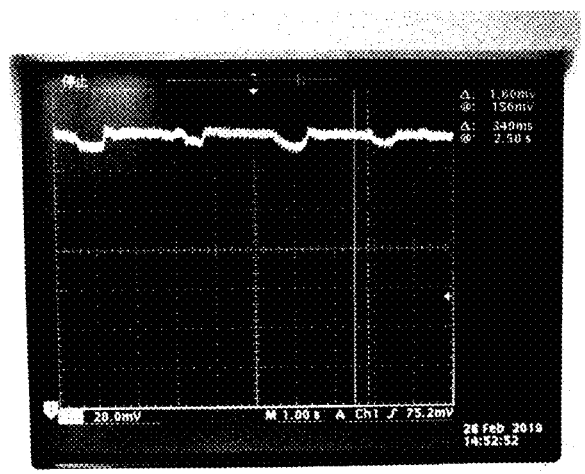

Referring to FIG. 6, when a stress is applied to the nanomesh electrode, a description will be given of the change in electrical resistance value. FIG. 6 is a diagram for explaining the measurement of the change in the electrical resistance value of the nanomesh electrode. FIG. 6 (A) is a schematic diagram of a measurement system, FIGS. 6 (B) and (C) shows a screen of an oscilloscope for displaying a change in electrical resistance value.

Here, a fixed resistor 140 of 100Ω was connected in series to the nanomesh electrode 110, a voltage was applied to one end of the fixed resistor that was not connected to the nanomesh electrode 110, one end of the nanomesh electrode 110 that was not connected to the fixed resistor 140 was grounded, the other end of the fixed resistor 140 was connected to the other end of the nanomesh electrode 110, and the voltage at the connection point between the fixed resistor 140 and the nanomesh electrode 110 was measured.

FIG. 6(B) shows the voltage change when compressive stress and tensile stress are repeatedly applied to the nanomesh electrode, and FIG. 6(C) shows the voltage change when the nanomesh electrode is repeatedly twisted.

As shown in FIGS. 6 (B) and (C), by applying various stresses to the nanomesh electrode, it can be seen that the voltage to be measured is changed, i.e., the resistance of the nanomesh electrode is changed.

Figure 7:
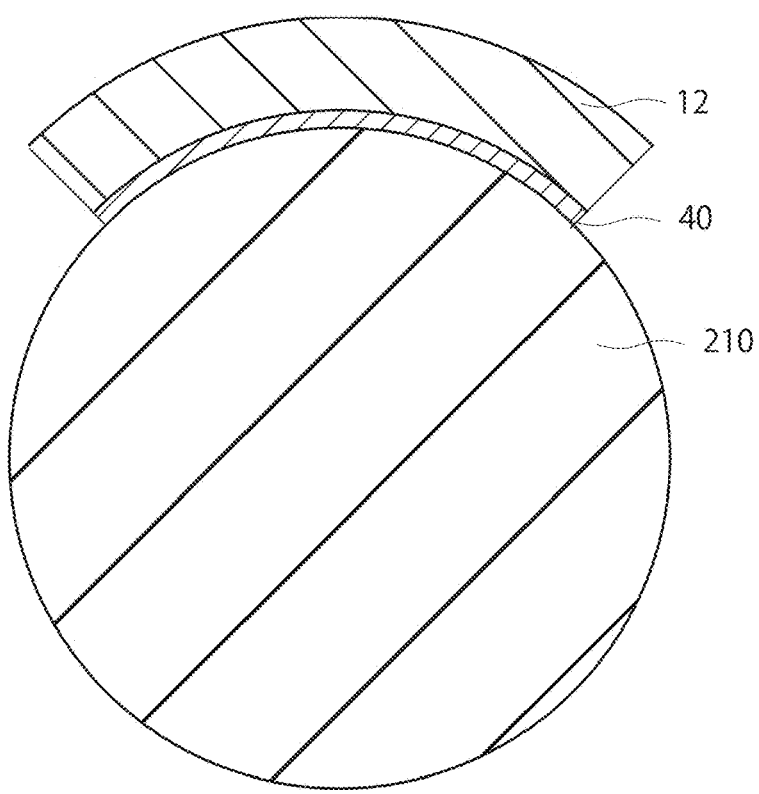
FIGS. 7(A)-(B) is a are schematic diagrams for explaining a method of measuring the electrical resistance value.
Figure 7:
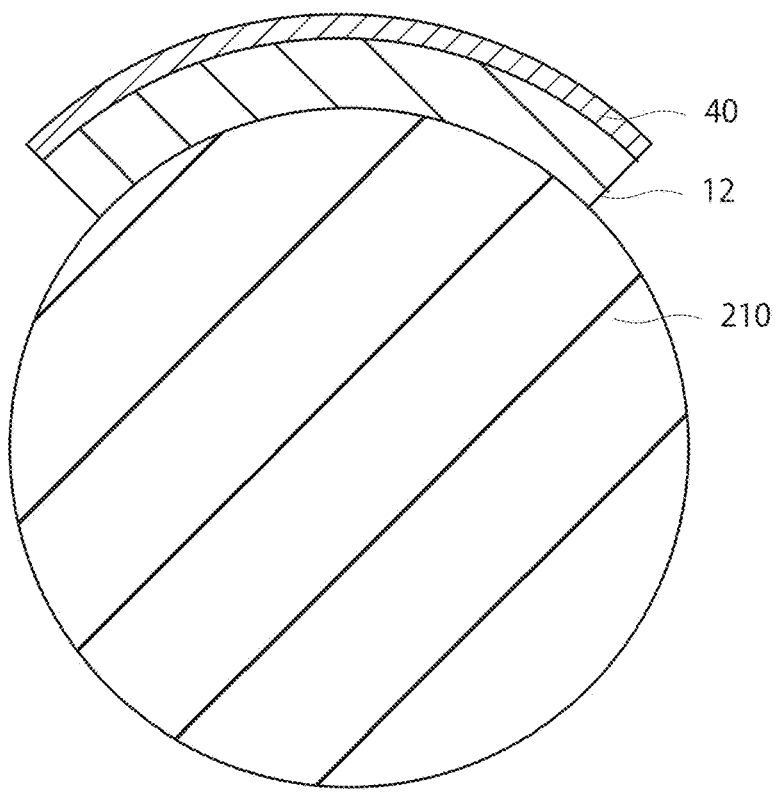

Referring to FIG. 7 and Table 1, the electrical resistance value when applying the tensile stress and compressive stress, respectively. FIG. 7 is a schematic diagram for explaining a method of measuring the electrical resistance value.

TABLE 1

| Thickness of fiber network (μm) | Thickness of conductive film (nm) | Electrical resistance under compressive stress (Ω) | Electrical resistance under tensile stress (Ω) | Electrical resistance under tensile stress/ Electrical resistance under compressive stress |
|---|---|---|---|---|
| 7 | 50 | 1530 | 2071 | 1.35 |
| 10 | 50 | 869 | 1197 | 1.38 |
| 7 | 75 | 599 | 835 | 1.39 |
| 10 | 75 | 480 | 652 | 1.36 |

Table 1 shows the electrical resistance values at the time of application of compressive stress and tensile stress of the nanomesh electrode in which two types of conductive layer having a thickness of 50 nm and conductive layer having a thickness of 75 nm were prepared for each of the nanomesh electrodes having a thickness of 7 μm and a thickness of 10 μm.

Here, the conductive layer is provided only on one main surface side of the fiber network. The nanomesh electrode was cut out into a rectangular shape with a width of 5 mm and a length of 30 mm, and brought into close contact with a cylinder 210 with a radius of 20 mm By making the surface provided with the conductive layer 40 in close contact with the cylinder 210, a compressive stress is applied to the fiber network 12 on the side where the conductive layer 40 is formed (see FIG. 7 (A)). Further, by making close contact with the surface on the opposite side of the surface provided with the conductive layer 40 to the cylinder 210, and applying a tensile stress to the fiber network 12 on the side where the conductive layer 40 is formed (see FIG. 7 (B)).

In both nanomesh electrodes, when tensile stress is applied, the electrical resistance value is increased by about 35% to 40% as compared with the case when compressive stress is applied. Therefore, it can be seen that this nanomesh electrode is useful as a detection section of the strain sensor.

As the detection portion of the strain sensor, a nanomesh electrode having excellent resistance to expansion and contraction as described above can be used, but the present invention is not limited thereto. Any suitable conventionally known nanomesh electrode may be used for the detector.

DESCRIPTION OF REFERENCE SIGNS

10 Fiber network
11 Coated fiber network
12 Nanomesh electrode
20 Fiber
30 Coating layer
40 Conducting layer
110 detection section (nanomesh electrode)
120 Measuring section
130 Output section
140 Fixed resistance
200 Measurement object
210 Cylinder

The invention claimed is:

1. An electronic functional member comprising:
   fibers that constitute a fiber network and are formed in a network form,
   coating layers that coat said fibers and have a Young's modulus lower than said fibers, and
   conductive layers formed on the surface of the coating layers.

2. The electronic functional member according to claim 1, wherein
   the fibers are formed by an electrospinning process.

3. An electronic functional member comprising:
   fibers that constitute a fiber network, are formed in a network form, and are formed of one of a material selected from the group consisting of Polyurethane, polyvinyl alcohol (PVA) derivative and polyvinylidene fluoride (PVDF) constituting the fiber network,
   coating layers that coat said fibers, have a Young's modulus lower than said fibers, and polydimethylsiloxane (PDMS) or an ethylene vinyl acetate (EVA) resin as a material, and
   conductive layers formed on the surface of the coating layers.

4. The electronic functional member according to claim 1, wherein
   the fiber network is formed in a sheet shape,
   the conductive layer is formed on a surface of a first side of the fiber network.

5. The electronic functional member according to claim 1, wherein
   the conductive layer is formed on a surface of a first side of the fiber network and on a surface of a second side of the fiber network.

6. A strain sensor comprising:
a detection section, a measuring section and an output section, wherein
the detection section comprises the electronic functional member according claim 1, is attached to a measurement object, and is a section where the electrical resistance value changes according to the shape or change thereof of the measurement object,
the measuring section measures the electrical resistance value of the detection section, and sends the electrical resistance value to the output section, and
the output section outputs a predetermined signal based on the electrical resistance value received from the measuring section.

7. The strain sensor of claim 1, wherein the conductive layer is formed by one of vacuum evaporation, a sputtering method, spin coating, slit coating, or screen printing using a dispersion liquid to form the conductive member.

\* \* \* \* \*